No. 865,861. PATENTED SEPT. 10, 1907.
N. & J. L. BROWN.
CORN HARVESTING MACHINE.
APPLICATION FILED APR. 14, 1906.
4 SHEETS—SHEET 3.
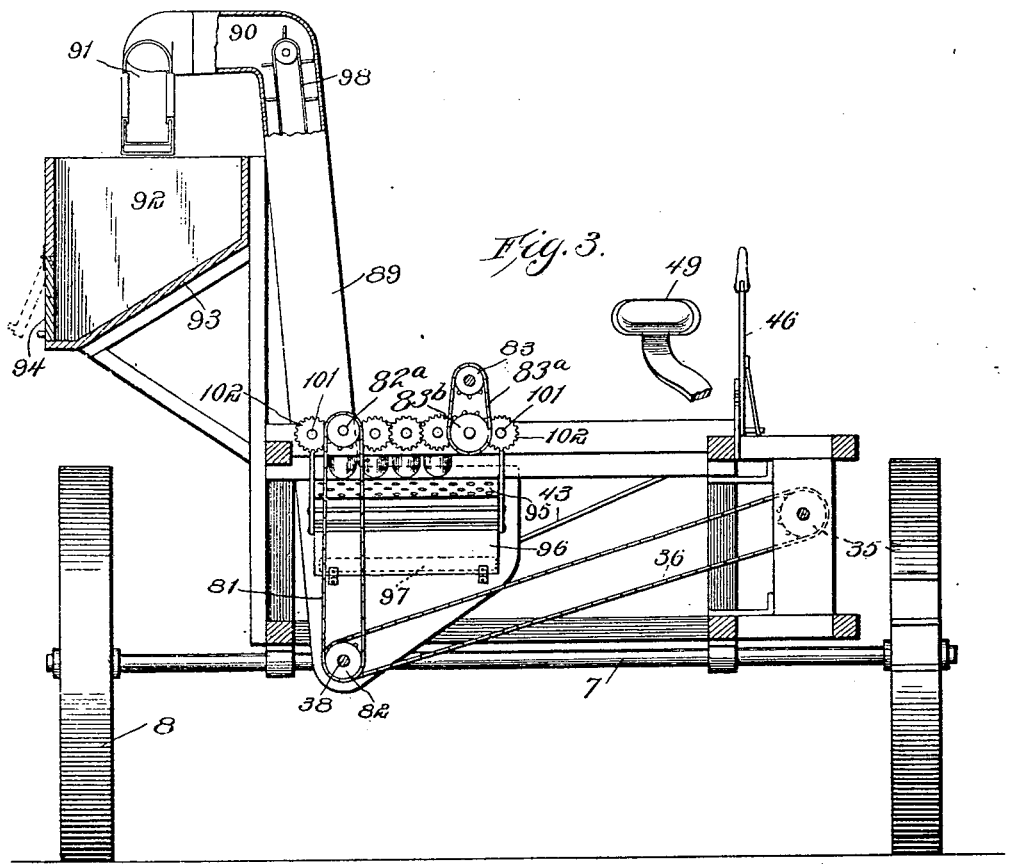
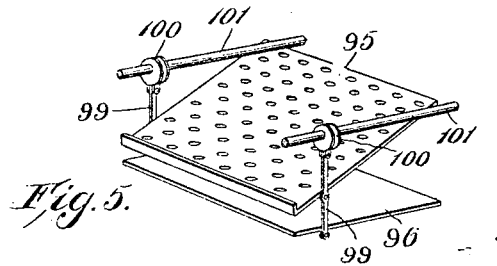
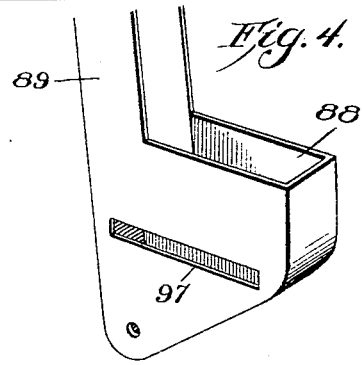
Inventors
Nathanael Brown
John L. Brown
Witnesses
By Victor J. Evans
Attorney No. 865,861. PATENTED SEPT. 10, 1907.
N. & J. L. BROWN.
CORN HARVESTING MACHINE.
APPLICATION FILED APR. 14, 1906.
4 SHEETS—SHEET 4.
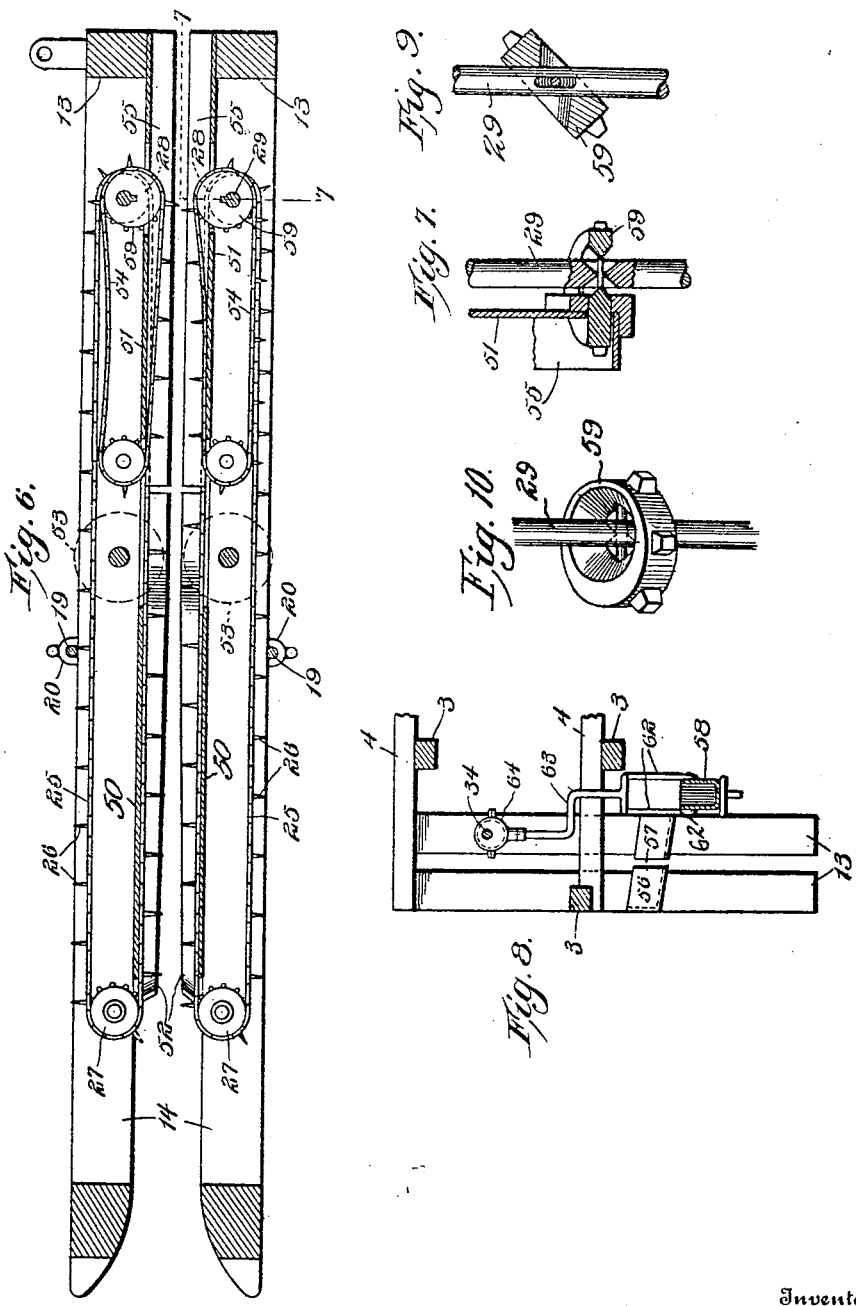
Witnesses
Inventors
Nathaniel Brown
John L. Brown
By Victor J. Evans.
Attorney

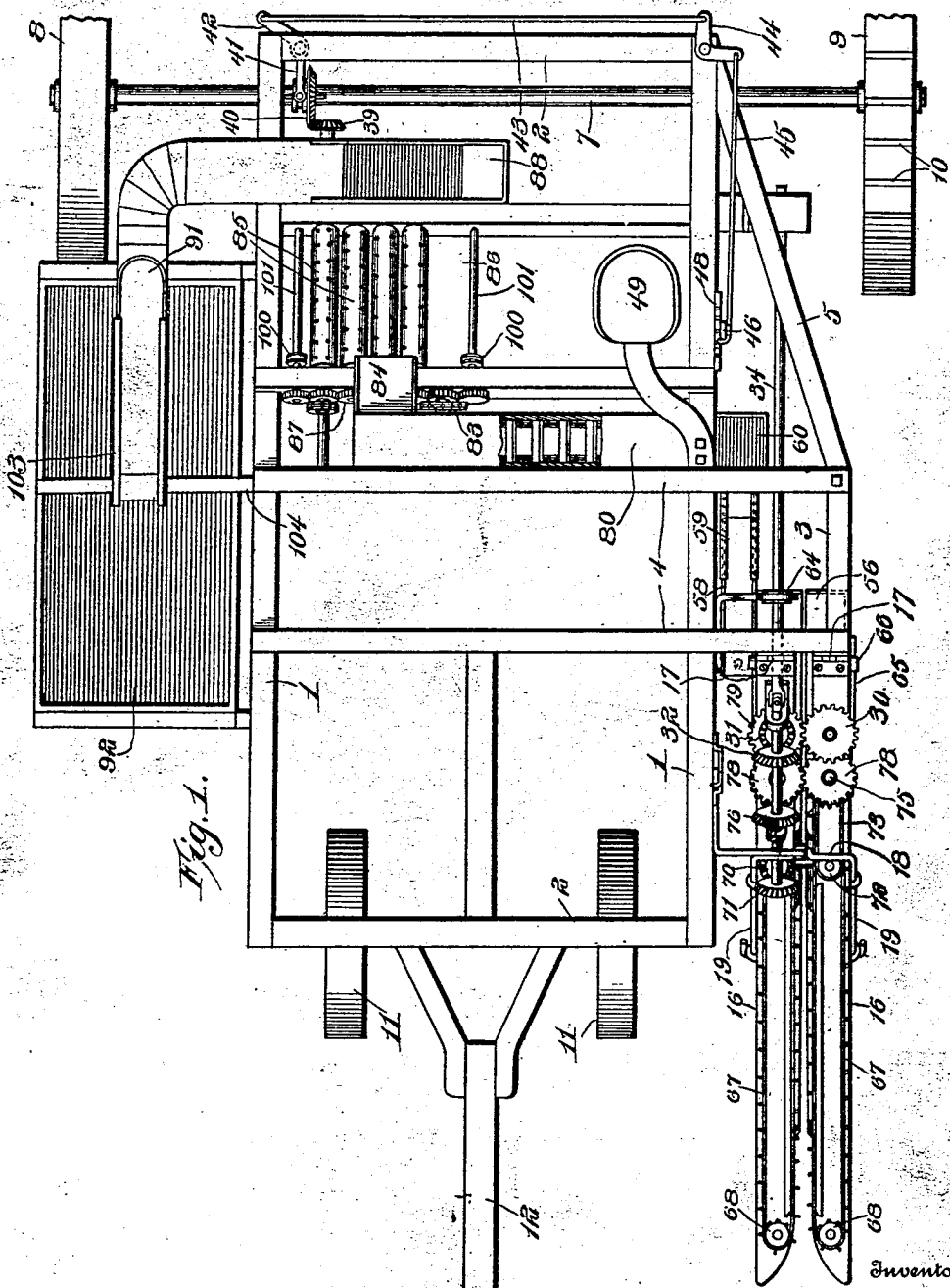

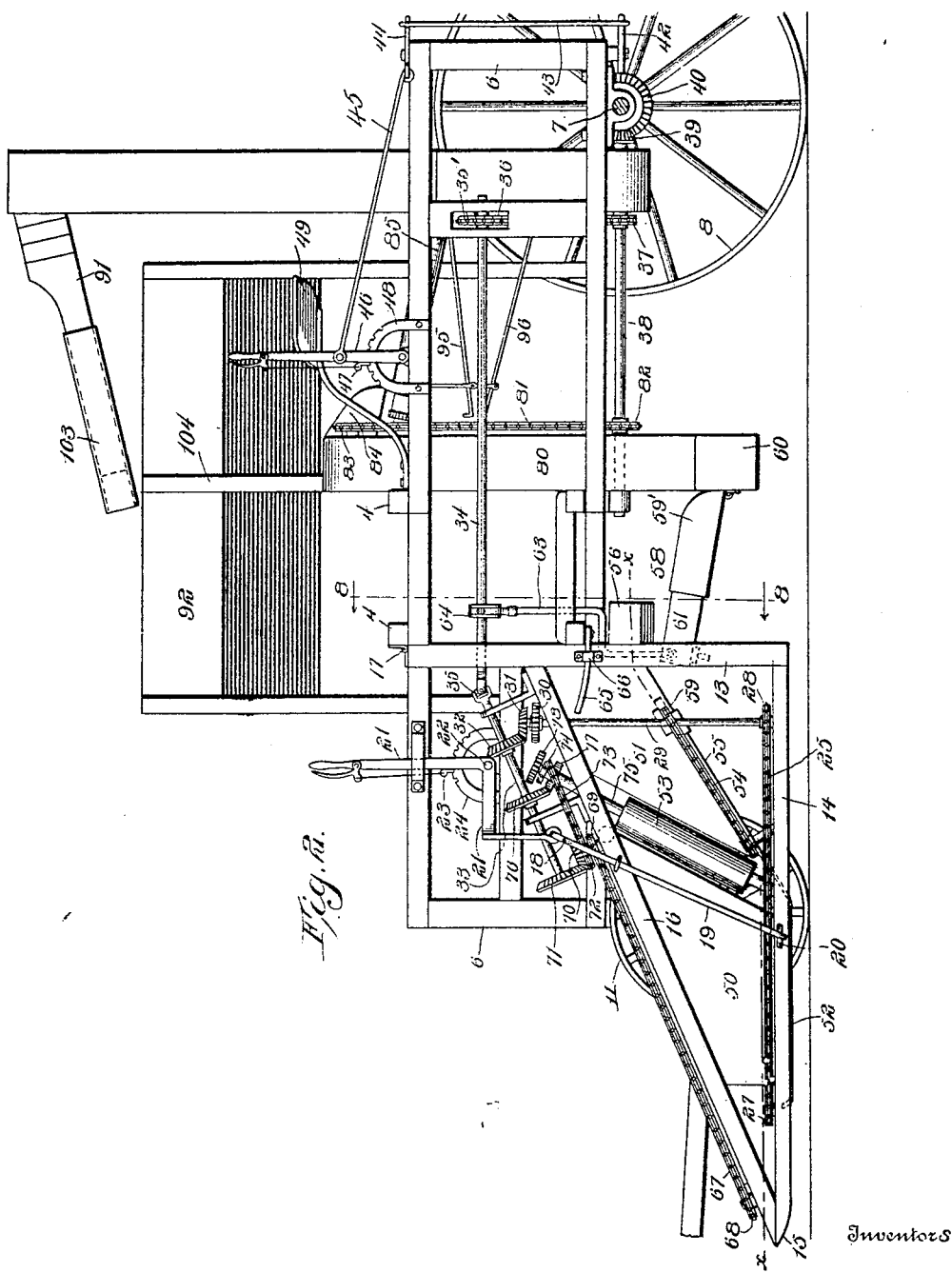

UNITED STATES PATENT OFFICE.

NATHANAEL BROWN AND JOHN L. BROWN, OF STAR CITY, INDIANA.

CORN-HARVESTING MACHINE.

No. 865,861.  Specification of Letters Patent.  Patented Sept. 10, 1907.

Application filed April 14, 1906. Serial No. 311,805.

*To all whom it may concern:*

Be it known that we, NATHANAEL BROWN and JOHN L. BROWN, citizens of the United States, residing at Star City, in the county of Pulaski and State of Indiana, have invented new and useful Improvements in Corn-Harvesting Machines, of which the following is a specification.

This invention relates to corn harvesting machines, the object of the invention being to provide a machine of the class described adapted to be drawn across the field and embodying mechanism for snapping or stripping the ears from the stalks while standing, moving the ears onward to a suitable elevator, removing the husks from the ears and delivering them into another elevator which carries them to a final receptacle; also means for gathering and screening the loose corn separated from the ears by the husking rollers; also means for adjusting the pickers so as to dispose the same in close proximity to the ground; also means for throwing the machine as a whole in and out of gear.

With the above and other objects in view, the nature of which will more fully appear as the description proceeds, the invention consists in the novel construction, combination and arrangement of parts hereinafter more fully described, illustrated and claimed.

In the accompanying drawings, Figure 1 is a plan view of a corn husking machine embodying the present invention. Fig. 2 is a side elevation of the same. Fig. 3 is a sectional front elevation thereof. Fig. 4 is an enlarged detail perspective view of the hopper of the second elevator. Fig. 5 is a perspective view of the shaking screen and table. Fig. 6 is an enlarged sectional plan view of the picker shoes and conveyer chains, etc. taken on the line $x$—$x$ of Fig. 2. Fig. 7 is a sectional view of the main trough or cutter, showing one of the eccentric sprockets, said section being taken on the line 7—7 of Fig. 6. Fig. 8 is a section on the line 8—8 of Fig. 2. Fig. 9 is a detail view showing one of the eccentric sprockets in section, and the shaft therefor. Fig. 10 is a detail elevation of the same.

The machine in its general organization comprises a substantially rectangular frame embodying the longitudinal side bars 1, the end cross-bars 2, the laterally offset picker frame supporting bar 3, the intermediate cross-bars 4 which brace the main frame and also brace the lateral picker frame supporting bar, and the oblique brace 5 which connects the picker frame supporting bar with the main frame. Two sets of side bars 1 are employed, as shown in Fig. 2, the same being placed one above the other at a suitable distance apart and connected by suitable posts 6, the frame thus constructed forming the support for the mechanism hereinafter particularly described. Said frame is also supported at the rear by a rotary axle 7 provided with carrying wheels 8 and 9, the latter constituting the driving wheel of the machine and being provided with traction ribs 10. At the front, the frame is mounted upon a truck embodying truck wheels 11 and a suitable frame to which the tongue or draft pole 12 is connected.

Connected to the projecting end of one of the cross-bars 4 is a picker frame embodying downwardly extending parallel straddle bars 13 spaced apart far enough to allow the stalks to pass between them after the ears have been stripped therefrom. The straddle bars 13 extend to a point near the ground and have connected thereto the rear ends of parallel picker shoes 14 which extend forward a suitable distance and have their forward extremities beveled, as shown at 15, the said forward extremities of the shoe being connected to inclined frame bars 16 which extend upward and backward at a suitable inclination and are secured at their rear ends to the straddle bars 13, the arrangement being clearly shown in Fig. 2.

The straddle bars 13 are connected by hinge joints 17 to the frame, as shown in Fig. 2, so that the entire picker frame as a whole is adapted to be rocked on the hinge joints 17 for the purpose of raising and lowering the forward extremities of the picker shoes, this being accomplished by means of a yoke 18, the arms 19 of which straddle the picker frame and are connected at their extremities to the shoes at the point 20. The upper end of the yoke is connected to and supported by the arm of an elbow lever 21 fulcrumed at 22 on the machine frame and provided with a thumb latch 23 which engages a rack segment 24 on the main frame so that by rocking the picker frame adjusting lever 21, the yoke 18 is moved upward or downward, thereby correspondingly raising or lowering the forward end of the picker frame for the purpose of adjusting the same to engage the lowermost ears on the stalks and yet ride clear of the surface of the ground.

Extending lengthwise of the picker shoes 14 are conveyer chains 25 having the outwardly projecting spikes or teeth 26, said chains passing around sprocket wheels 27 near the forward ends of the shoes 14 and also passing around other sprocket wheels 28 near the rear ends of the shoes, the last-named sprocket wheels being mounted fast on upwardly extending shafts 29 by which motion is imparted to said conveyer chains. The shafts 29 are provided at their upper ends with intermeshing gear wheels 30, whereby motion is imparted to the chains 25 in opposite directions and one of said shafts 29 is provided with a bevel gear 31 which is driven by a bevel gear 32 on the forward section 33 of a tumbling shaft 34, the sections of said shaft being connected by a universal joint 35.

The shaft 34 extends to a point near the rear of the machine where it is provided with a sprocket wheel 35' from which a chain 36 extends downward and across the machine around another sprocket wheel 37 mounted on a low horizontal shaft 38 extending longitudinally of the machine. The shaft 38 is provided at its rear end with a bevel pinion 39 which meshes with and is driven by a gear wheel 40 on the revolving axle 7, the gear wheel 40 having a splined engagement with the axle 7 and adapted to be shifted lengthwise on the axle 7 by means of a shipper fork 41 which operates to throw the machine into and out of gear. The shipper fork 41 is provided with a lever extension 42 from which a connecting rod 43 extends to an elbow lever 44 fulcrumed on one of the rear corners of the machine and connected by means of a rod 45 to a clutch operating lever 46 provided with a thumb latch 47 which engages a rack segment 48 fast on the machine frame, as clearly shown in Fig. 2, the lever 46 being arranged close to the driver's seat 49 so that he may rock said lever and throw the machine into and out of gear at a moment's notice. It may be noted at this point that by shifting the gear wheel 40 away from the pinion 39, all of the various mechanisms which operate on the corn are thrown out of gear.

It will be understood that a pair of picker shoes 14 is employed, together with a pair of straddle bars 13 and a pair of inclined frame bars 16, the pairs of bars being arranged in parallel relation to each other and at a sufficient distance apart to allow the stalks to pass between them as the machine is drawn across the field. The two frames thus formed are partially closed in at the sides by the side plates 50 and 51 which form the sides of a trough for preventing the escape of the ears of corn, the bottom of said trough being formed by plates 52 secured to the shoes 14 extending inward therefrom and terminating at their inner edges at a sufficient distance apart to admit only the stalks of the corn, being thus adapted to support the ears as they are carried backward by the conveyer chains 25.

53 designates a pair of snapping rolls arranged at a suitable distance apart to allow the stalks to pass between them, said rolls engaging ears and snapping or stripping the same from the stalks as the stalks are carried backward in rear of the rolls. These rolls 53 extend upward at an inclination, as clearly shown in Fig. 2, the lower ends of said rolls being located above the conveyer chains 25 so that as the ears are snapped off the stalks by said rolls, they fall upon the bottom 52 of the trough and are then carried by the conveyer chains 25 backward beneath the lower ends of the rolls 53 where they are taken up by oppositely arranged carrier chains 54 which operate over an inclined section 55 of the trough, which trough section extends from the shoes 14 upward to the straddle bars 13, as shown in Fig. 2. The chains 54 carry the ears upward along the trough section 55 and they are discharged into a laterally inclined trough extension 56 which is best shown in Fig. 8, said trough extension or chute being divided at the point 57 to allow the stalks to pass between the sections thereof, while the ears which fall into the chute or trough extension 56 gravitate laterally into a longitudinally extensible shaking trough 58. The chains 54 are driven by wabbling or eccentric sprockets 59 on the shafts 29 hereinabove described, the eccentric sprockets serving to move the rear end portions of the carrier chains 54 inward and outward or toward and away from each other so as to prevent the congestion of ears between the chains and allow the same to pass onward through the machine.

The extensible trough 58 is best shown in Fig. 2, where it is seen to comprise a main hinged section 59' which is pivotally connected to the hopper 60 of the primary elevator, and a telescopic section 61 which slides into the hinged section 59', the section 61 being pivotally connected to the forked arms 62 of a link or connecting rod 63 which is moved upward and downward by an eccentric 64 on the shaft 34 hereinabove described, a rapid oscillatory or vibratory movement being thus imparted to the trough 58 which causes the ears to gravitate along the trough into the hopper 60. By reference to Fig. 2, it will be noted that the trough 58 slants downward toward its discharge end, the agitation or shaking of said trough, in connection with the slanting thereof, insuring the discharge of the ears into the hopper 60. The purpose of constructing the trough 58 in the manner above described is to allow for variation in the distance between the lower part of the picker frame and the stationary hopper 60, due to changing the angle of the picker frame for raising or lowering the forward extremities of the picker shoes. 65 designates guides secured to the machine frame which are embraced by eyes or straps 66 on the picker frame, the parts 65 and 66 serving to steady and brace the picker frame.

67 designates a pair of stalk gripping and carrying chains which are mounted on the upper sides of the inclined frame bars 16, running over sprocket wheels 68 on the forward ends of the frame bars and over other sprocket wheels 69 on said frame bars just in front of the snapping rolls 53, as shown in Fig. 2. The sprocket wheels 69 are mounted on short shafts journaled on the frame bars 16 and one of said shafts is provided with a bevel gear 70 which meshes with a bevel wheel 71 on the tumbling shaft section 33, as shown in Fig. 2, whereby motion is imparted to one of the chains 67. On the opposite shaft 69 is mounted a second sprocket wheel 72 from which a chain 73 extends around a bevel sprocket wheel 74 on the shaft 75 of one of the snapping rolls 53, motion being thus imparted to the oppositely located chain 67, said chains being driven simultaneously in opposite directions by the mechanism described. The shaft section 33 is also provided with another beveled wheel 76 which meshes with a pinion 77 on the shaft 75 of one of the snapping rolls 53, whereby rotary motion is imparted to said snapping roll, and the shafts of both snapping rolls are geared together by means of spur gears 78, whereby they are both driven simultaneously in opposite directions.

After the ears are deposited in the hopper 60, they are carried upward through the housing 80 of the primary elevator which embodies an endless chain having carrying blades, the said elevator being of conventional form and being driven by a sprocket chain 81 passing over a sprocket wheel 82 on the shaft 38 above described, and over another sprocket wheel 82ᵃ on a shaft of one of the husking rolls, a short chain 83ᵃ passing around a sprocket wheel 83 on the upper shaft of the elevator, and around a sprocket wheel 83ᵇ on the shaft of another husking roll Fig. 3.

The elevator 80 is provided at its upper end with a discharge spout 84 which overlies the husking rollers 85 best shown in Fig. 1. These husking rollers are provided with the usual projecting husking teeth 86 and are arranged parallel to each other and at a slight distance apart, which permits the teeth to strip the husks from the ears, the husks passing downward through the spaces between the husking rollers, while the ears gravitate lengthwise of the rollers toward the rear ends thereof, the said husking rollers being inclined downward rearwardly, as shown in Fig. 2.

Any desired number of husking rollers may be employed and the same are geared together, as shown at 87 in Fig. 1, so that each adjacent pair of husking rollers operates in a reverse direction.

The ears passing off the husking rollers 85 drop into a second hopper 88 located just in rear thereof and from said hopper 88, a second elevator 89 extends upward, as best shown in Figs. 3 and 4, the upper end of the elevator casing communicating by means of a lateral neck 90 with a discharge chute or spout 91 which extends over a receptacle 92 located at one side of the machine and over one of the carrying wheels and having an inclined bottom 93 and a door 94 which adapts the corn to be discharged into a wagon at the side of the corn husking machine.

Located directly under the husking rollers is a shaking slanting screen 95 which is best illustrated in Fig. 5 where it is seen to consist of a perforated plate upon which the loose corn separated from the ears by the teeth of the husking rollers is allowed to gravitate. The openings in the sieve 95 are sufficiently large to permit the grains to pass therethrough and fall upon a reversely slanting imperforate table 96, the rear lower edge of which is received in a slot or opening 97 in the adjacent side of the hopper 88, whereby the loose corn is directed into the hopper and carried upward through the elevator casing 89 by means of the elevator 98 along with the ears to the final receptacle 92. Both the sieve 95 and the table 96 are agitated by means of shaker links or connections 99 which pivotally connect with the sieve and table, as shown in Fig. 5, and are connected at their upper ends to straps which embrace eccentrics 100 on a pair of parallel side shafts 101 arranged at opposite sides of the husking rollers and geared to the husking rollers by means of the gears 102 shown in Fig. 3.

The spout or chute 91 is provided with an extensible section or mouth piece 103 so that the discharge end thereof may be disposed over either of a plurality of compartments into which the receptacle 92 is divided by means of one or more partitions 104, as shown in Fig. 2.

I claim:

1. A corn harvesting machine comprising a pair of upstanding snapping rolls, and stalk carrier chains one set operating above and another beneath the snapping rolls and acting to carry the stalks between and past the snapping rolls, substantially as described.

2. A corn harvesting machine comprising a pair of upstanding snapping rolls, and sets of stalk conveyer chains one running above and another beneath the snapping rolls and acting to carry the stalks between the rolls and beyond the same, the lower set of chains acting to pass the ears under the rolls for delivery.

3. A corn harvesting machine comprising parallel upstanding snapping rolls, sets of stalk conveyer chains operating one above and another beneath said rolls and acting to carry the stalks between the snapping rolls and past the same, a trough to receive the ears, and carrier chains for delivering the ears from said trough.

4. A corn harvesting machine comprising upstanding snapping rolls arranged side by side, a substantially horizontal pair of stalk conveyer chains working beneath the snapping rolls, parallel stalk conveying chains disposed over the snapping rolls, a trough comprising side plates extending beneath the snapping rolls to receive the ears, said trough having an extension which inclines upward and rearward in rear of the snapping rolls, carrier chains operating over the inclined section of the trough, husking rollers, an elevator interposed between said trough and the husking rollers, and a second elevator which receives the corn from the husking rollers and delivers the same to a wagon.

5. A corn harvesting machine comprising a main frame and carrying wheels therefor, a picker frame having a jointed connection therewith, means for adjusting the angle of said picker frame relatively to the main frame, upstanding snapping rolls arranged side by side and carried by the picker frame, sets of stalk conveying chains operating one above and another beneath the snapping rolls, a trough comprising side plates on the picker frame along which the ears are carried, an elevator mounted on the main frame, and an extensible trough interposed between the picker frame and said elevator.

6. A corn harvesting machine comprising a main frame, carrying wheels therefor, a picker frame having a jointed connection with the main frame, means for adjusting the angle of the picker frame relatively to the main frame, upstanding snapping rolls carried by the picker frame, sets of stalk conveyer chains running one above and another beneath the snapping rolls, a trough comprising side plates carried by the picker frame along which the ears are fed, an elevator mounted on the main frame of the machine, a longitudinally extensible trough interposed between the trough of the picker frame and the elevator of the main frame, and means for shaking said extensible trough.

7. A corn harvesting machine comprising snapping rolls arranged side by side, stalk conveyer chains one set working above and another beneath the snapping rolls and acting to carry the stalks between and past the snapping rolls, a trough comprising side plates extending under the snapping rolls and inclined upward and rearward in rear thereof, carrier chains operating over the inclined portion of the trough, and gears for driving said carrier chains and moving the same bodily toward and away from each other during their operation.

In testimony whereof, we affix our signatures in presence of two witnesses.

NATHANAEL BROWN.
JOHN L. BROWN.

Witnesses:
F. P. BUCK,
H. B. WASHBURN.